United States Patent [19]
Henry, Jr.

[11] Patent Number: 5,881,169
[45] Date of Patent: Mar. 9, 1999

[54] APPARATUS AND METHOD FOR PRESENTING AND GATHERING TEXT ENTRIES IN A PEN-BASED INPUT DEVICE

[75] Inventor: Raymond Charles Henry, Jr., Wake Forest, N.C.

[73] Assignee: Ericsson Inc., Research Triangle Park, N.C.

[21] Appl. No.: 714,361

[22] Filed: Sep. 13, 1996

[51] Int. Cl.[6] .......................................... G06K 9/00
[52] U.S. Cl. ............................. 382/187; 382/229
[58] Field of Search ..................... 382/187, 229, 382/230

[56] References Cited

U.S. PATENT DOCUMENTS

| | | | |
|---|---|---|---|
| 4,330,845 | 5/1982 | Damerau | 707/507 |
| 4,559,598 | 12/1985 | Goldwasser et al. | |
| 4,589,142 | 5/1986 | Bednar | 382/226 |
| 5,022,081 | 6/1991 | Hirose et al. | 704/235 |
| 5,128,672 | 7/1992 | Kaehler | 341/23 |
| 5,151,950 | 9/1992 | Hullender | 382/187 |
| 5,191,622 | 3/1993 | Shojima et al. | 382/185 |
| 5,276,794 | 1/1994 | Lamb, Jr. | 395/149 |
| 5,365,598 | 11/1994 | Sklarew | |
| 5,392,363 | 2/1995 | Fujisaki et al. | |
| 5,410,612 | 4/1995 | Arai et al. | |
| 5,479,536 | 12/1995 | Comerford | |
| 5,649,027 | 7/1997 | Mahajan et al. | 382/185 |
| 5,724,457 | 3/1998 | Fukushima | 382/311 |
| 5,748,512 | 5/1998 | Vargas | 364/709.12 |

FOREIGN PATENT DOCUMENTS

| | | |
|---|---|---|
| 1-253079 | 9/1989 | Japan. |
| 2217499 | 10/1989 | United Kingdom ............. G06F 3/02 |

OTHER PUBLICATIONS

*Smart Virtual Keyboard System Suitable for Mouse or Stylus Entry*, R. W. Knodt, Xerox Disclosure Journal, vol. 18, No. 3, May 1, 1993, pp. 245–246, XP000367968.

*Predictive Keyboard Optimized for Multiple Text Types*, IBM Technical Disclosure Bulletin, vol. 38, No. 6, Jun. 1, 1995, pp. 371/372 XP000520700.

*Primary Examiner*—Joseph Mancuso
*Assistant Examiner*—Martin E. Miller
*Attorney, Agent, or Firm*—Jenkens & Gilchrist

[57] ABSTRACT

A method and apparatus for presenting and gathering text entries in a pen based input device. The apparatus and method allows for the entry of textual information into a computing device using either handwriting recognition, character selection, or expression selection. Individual entry and selection fields for each of these methods are provided to the user in a coordinated comprehensive method of displaying and gathering the textual information. Handwriting recognition functionality is used to facilitate character recognition. Furthermore, lists of expressions allow the text entry method and apparatus to anticipate the next character or expression to be entered by the user.

11 Claims, 5 Drawing Sheets

APPARATUS AND METHOD FOR PRESENTING AND GATHERING TEXT ENTRIES IN A PEN-BASED INPUT DEVICE

BACKGROUND OF THE INVENTION

1. Technical Field of the Invention

The present invention pertains in general to an apparatus and method for keyboardless entering of data into a computing device, and more particularly, to an apparatus and method utilizing handwriting recognition, character selection, and word/phrase/mnemonic selection for keyboardless entering of data into a computing device using a pen-based input device.

2. Description of Related Art

Increased use of computing devices especially in portable applications has resulted in an effort to find alternative methods to keyboards for entering text into computing devices. One approach utilizes a pen-based input device wherein a user prints characters on a pressure sensitive display using a pen. Pen strokes printed by the user appear on the display screen and a handwriting recognition function recognizes the character entered. Handwriting recognition functionality is well known in the industry and various manufacturers supply a variety of handwriting recognition applications. The various handwriting recognition applications have had varying degrees of success, however, they share a common drawback. Users must enter each character individually, character by character, resulting in a slow time-consuming process of text entry.

Another approach to keyboardless text entry which accelerates the text entry process provides a character selection field displaying a list of characters available for the user to input. The user simply touches the desired character in the entry field and the input device enters the selected character into an entry field on the display screen. A variation to this approach provides a character selection field displaying a list of characters anticipated by the input device to be the next character entered by the user rather than an exhaustive list of all available characters. The subset of characters likely to be entered is displayed to the user after the user has entered one or more characters and is based upon a database of words contained in memory. The database of words contained in memory can be either an exhaustive list of all words available such as a dictionary, a subset of words or mnemonics associated with a particular application running on the computing device such as an order entry device, or the database can be incrementally created by "learning" or recording words previously entered into the computing device.

Another approach to text entry for both devices using keyboards and devices without keyboards provides a word/phrase/mnemonic selection field similar to the character selection field. This field displays a list of words, phrases, or mnemonics anticipated by the input device to be the word, phrase, or mnemonic the user ultimately desires to enter. The term "expression" is understood in the industry to be an alphanumeric text string that can represent words, phrases, mnemonics, or other alphamnemonic text strings. The expression displayed for possible selection by the user is based on comparisons by the input device between characters enter thus far to expressions contained in a stored database. This stored database can be incrementally created by "learning" or recording previously entered expressions, but is generally a collection of expressions associated with a particular application running on the computing device.

Each of the approaches described thus far provides distinct benefits to keyboardless text entry yet no patent or reference has been discovered which coordinates the functioning of each of these approaches and incorporates them into a single universal method for presenting and gathering text entries. Such an incorporated device accelerates the text entry process and there is a need, therefore, for a method of presenting and gathering text entries utilizing handwriting recognition, character selection, and expression selection for entering text into a computing device.

SUMMARY OF THE INVENTION

The present invention comprises a text entry method for a computing device having a pressure sensitive display screen. The text entry method of the present invention divides the display screen into three input areas and one text entry field. The first area of the display screen allows the user of the computing device to print a character on the display screen where it is recognized as a character and entered into the text entry field. The second area of the display screen displays a set of characters which are likely to be entered by the user. The user points to a character on the display screen to select it and the character is entered into the text entry field. The third area of the display screen displays a set of words, phrases, or mnemonics also referred to as expressions which are likely to be entered by the user. The user points to the expression on the display screen to select it and the expression is entered into the text entry field. Text entered into the computing device is displayed in the text entry field.

The text entry device further comprises a database of expressions stored in memory of the computing device. The text entry device compares characters as they are entered into the computing device against the expressions contained in the database and calculates the characters and expressions which are most likely to be entered by the user and displays the characters and expressions in the character and expression selections areas.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
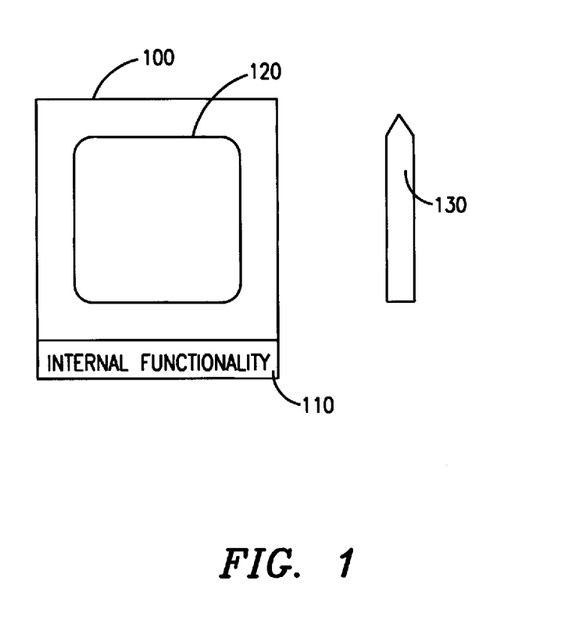
FIG. 1 illustrates a physical rendering of a pen-based portable computing device employing the present invention.

Referring now to FIG. 1, there is illustrated a physical rendering of a pen-based portable computing device employing the present invention. The portable computing device comprises a tablet 100 internally housing various functional components 110 and a surface mounted display screen 120. While not necessarily part of the portable computing device, a pen 130 permits a user to enter text into the computing device via the display screen. A portable computing device as displayed in FIG. 1, is common in the industry and generally possesses various control buttons and switches on the surface of the portable computing device. A keyboard, however, is typically not included as text entry is primarily accomplished by depressing the pen 130 against the display screen 120 in a character entry area to print a character rather than through the use of a keyboard.

Figure 2:
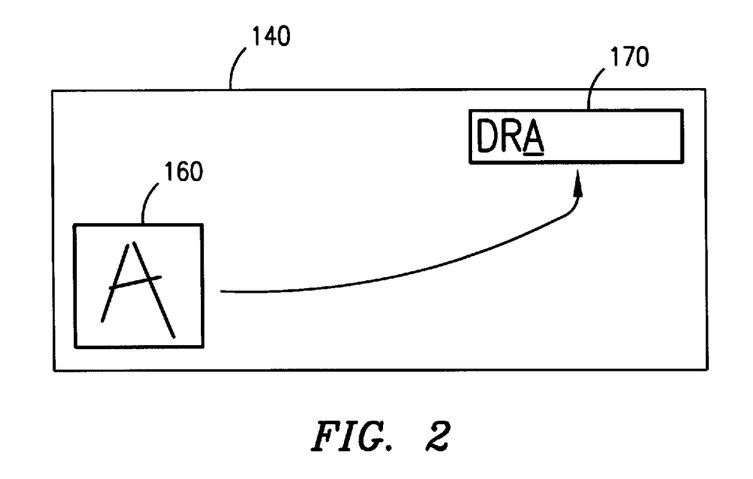
FIG. 2 illustrates a display screen for employing character recognition as a method of text entry.

Referring now to FIG. 2, there is illustrated a display screen for employing character recognition. The display screen 140 used for character recognition contains at least a character input area 160 and an entry field 170. After the computing device is powered up, the user of the device enters a character by printing the character in the character input area 160. The display screen 140 is pressure sensitive in the character input area 160 such that as the user of the computing device depresses the pen 130 of FIG. 1, in the character input area 160 to print the desired character, the display screen 140 displays the pen strokes in the character input area 160. The pen stroke information is also placed into a buffer for access by handwriting or character recognition functionality contained within the internal functionality 110 of FIG. 1. The handwriting recognition function recognizes the pen strokes as a particular character and instructs the computing device to display the recognized character in the entry field 170.

Figure 3:
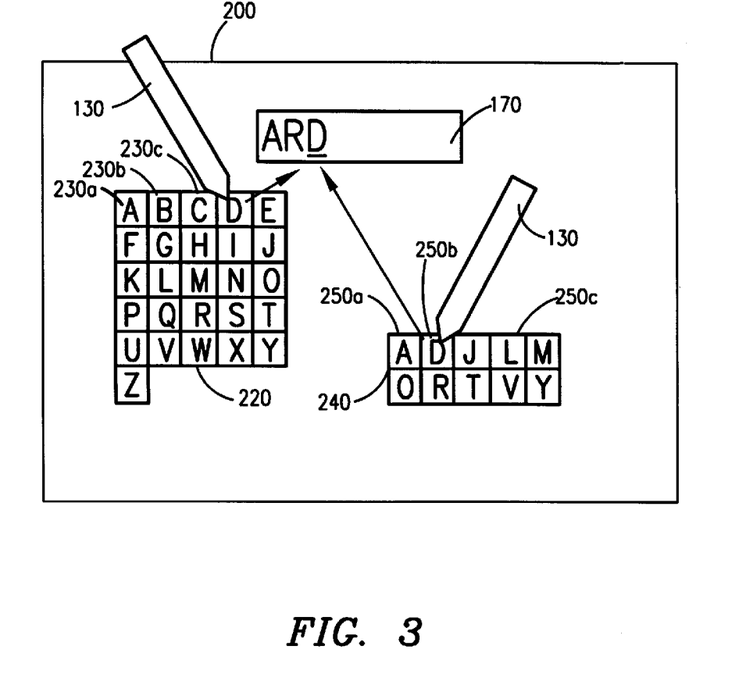
FIG. 3 illustrates a display screen for employing character selection as a method of text entry.

Referring now to FIG. 3, there is illustrated a display screen for employing character selection as a method of text entry. The use of character selection as a method for text entry can be used as the sole method for text entry or can be used in addition to the character recognition method illustrated in FIG. 2. The display screen 200 of a portable computing device employing character selection as a method of text entry contains an individual character selection field 220, further containing an exhaustive list of characters 230a, 230b, 230c, etc., which are potential candidates for text entry into the portable computing device. The individual character selection field 220 contains all the text characters which are available for entry into the particular computing device.

Also contained in the display screen 200, is an anticipated character selection field 240, which further contains a subset of text characters 250a, 250b, 250c, etc. which are anticipated by the text entry device as likely to be the next characters entered by the user. The list of characters in the anticipated character selection field 240 is a subset of the characters listed in the individual character selection field 220. The list of anticipated characters 250a, 250b, 250c, etc., is made available to the user after the user has entered one or more characters using either the individual character selection field 220 or the character recognition approach described in FIG. 1. The selection of characters to be displayed in the anticipated character selection field 240 is based on a spelling match between the characters entered by the user thus far and a database of words contained in the memory of the computing device. The database of words contained in the memory of the computing device can be an exhaustive list of words such as a dictionary, a subset of words or expressions associated with a particular application running on the computing device such as an order entry device, or the list of words and expressions can be "learned" or recorded incrementally as words and expressions are entered into the computing device, or any combination of the above. Using either the individual character selection field 220 or the anticipated character selection field 240, the user depresses the pen 130 against the display screen 200 in the location of the desired character. The text entry device then displays the chosen character in the text entry field 170.

Figure 4:
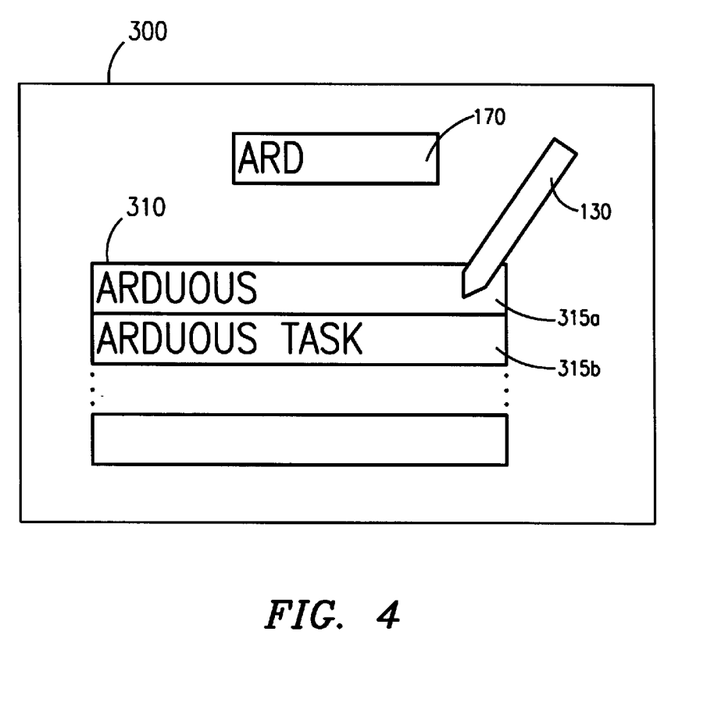
FIG. 4 illustrates a display screen having multiple anticipated expression fields as an enhancement to the character recognition and character selection methods of text entry.

Referring to FIG. 4, there is illustrated a display screen having multiple anticipated expression fields as an enhancement to the character recognition and character selection methods of FIG. 2 and FIG. 3. The present invention incorporates a method of anticipating the expression which the user ultimately desires to enter into the computing device in addition to handwriting recognition and character selection. The display screen 300 contains an anticipated expression field 310 having multiple entries 315a and 315b. After the user has entered one or more characters using either the handwriting recognition method of FIG. 2 or the character selection method of FIG. 3, the input device provides possible expressions which are potential candidates for entry into the computing device based on a comparison of the characters entered by the user thus far and a database of expressions contained in the memory of the computing device. If the expression which the user desires to enter into the computing device appears in the multiple anticipated expression fields 310a, 310b, etc., the user depresses the pen 130 on the display screen 300 in the entry field where the expression is displayed. The input device then displays the chosen expression in the data entry field 170. The database of expressions contained within the memory of the computing device can be created by the input device incrementally "learning" or recording expressions as they are entered into the computing device or the list can be a collection of expressions associated with a particular application running on the computing device or any combination of the above.

Figure 5:
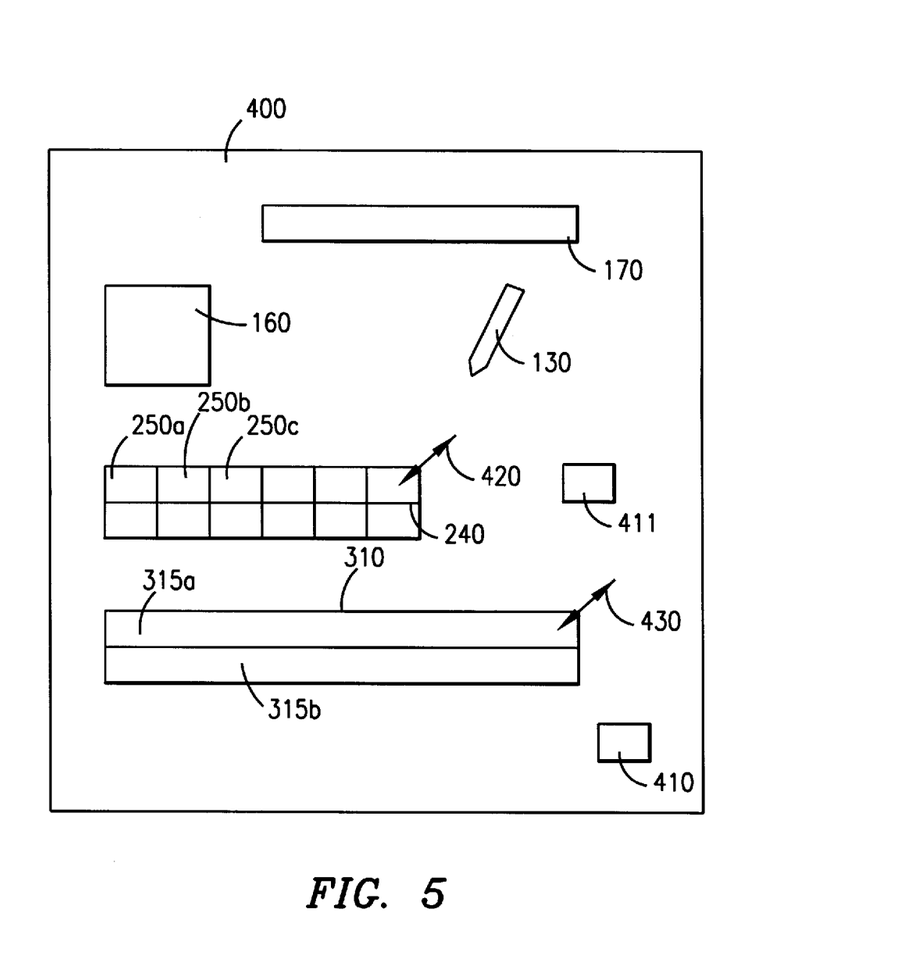
FIG. 5 illustrates a display screen employing the method for presenting and gathering text entries in a pen-based input device of a preferred embodiment of the present invention.

Referring now to FIG. 5, there is illustrated a display screen employing the method for presenting and gathering text entries in a pen-based input device of a preferred embodiment of the present invention. Display screen 400 contains a character input area 160 for entering characters using the handwriting recognition method as described in FIG. 2. The display screen 400 also incorporates an anticipated character selection field 240 further containing a subset of anticipated characters 250a, 250b, 250c, etc. The anticipated character selection field 240 allows the text entry device to provide the character selection method described in FIG. 3. Although another embodiment of the present invention can also incorporate the individual character selection field 220 of FIG. 3, the preferred embodiment of the present invention described herein does not. The individual character selection field can be accessible by the user invoking a function to display the additional field. The function can be invoked via a switch on the computing device or by the user depressing pen 130 on the individual character selection field activation area 411 The display screen 400 further contains an anticipated expression field 310 having multiple entries 315a and 315b for providing the anticipated expression text entry method described in FIG. 4. The anticipated character selection field 240 and the anticipated expression field can be varied in size by the user depressing pen 130 on the periphery of the entry fields 240 and 310a and dragging the periphery of the display field to the appropriate size and number of entries desired.

To enter data into the computing device, the user prints a character in the character input area 160 using pen 130, selects a desired character in the anticipated character selection field 240 by depressing the pen 130 on a selected character, or selects a desired expression displayed in the anticipated expression selection field 310 by depressing the pen 130 on the desired expression. After printing a character or selecting a character, or expression using any of the selection entry methods, the user presses an enter button which can be located either on the computing device or can be an "enter" area 410 on the display screen 400 which is activated by depressing the pen 130 on the "enter" area 410. Responding to the user's input, the text entry device enters the character or expression in the text entry field 170. Alternatively, the character or expression is entered into the text entry field 170 when the user touches a character in the anticipated character selection field 240 or an expression in the anticipated expression field 310.

Figure 6:
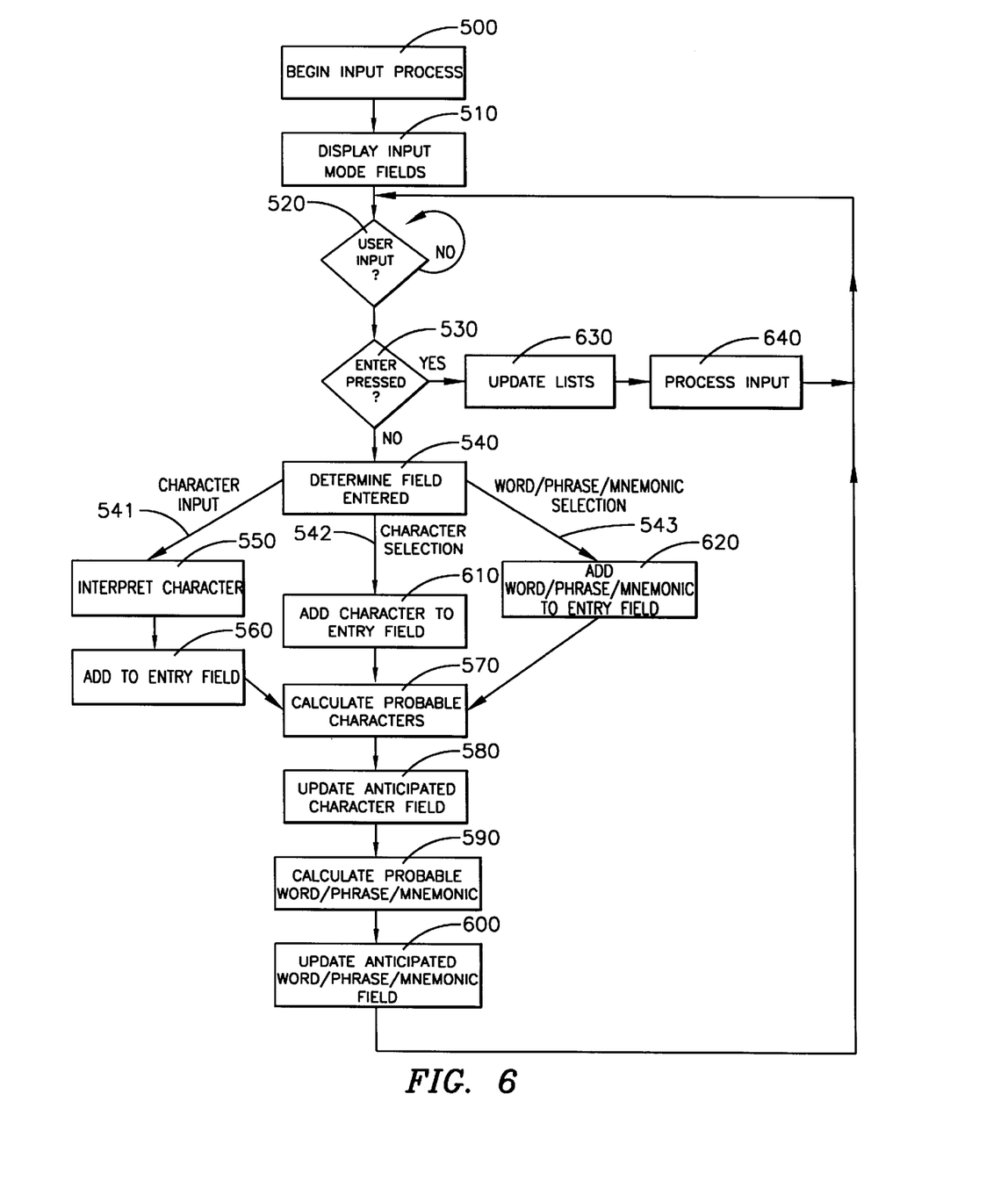
FIG. 6 illustrates a flow diagram of the text entry process of the present invention.

Further referring to FIG. 6 in addition to FIG. 5, there is illustrated a flow diagram of the text entry process of the present invention. To begin entering text into the computing device, the user initiates the input process (step 500). Initiation can be accomplished in any of a number of ways. For instance, simply turning on the computing device may place the device in the text entry process or the user may begin the process by pressing a button on the surface of the computing device or depress an area on the display screen. Once the input process has been initiated, the text entry device displays the input mode fields (step 510), as previously illustrated in FIG. 5. In addition to displaying the input mode fields (step 510), the text entry can display the characters and expressions which were displayed at the end of the last session, or alternatively, the text entry can display default characters and expressions. The default characters and expressions can be user specified or the characters and expressions most frequently used on "power up". The user can also select the text entry device to display the characters and expressions used at the end of the last session, the default characters and expressions, or to display the input mode fields (step 510) blank. The text entry device then idles, waiting for the user to input textual information (step 520). Once the user inputs information the text entry device determines if "enter" was entered (step 530). If "enter" was not entered, the text entry device determines which input mode field was entered (step 540), and follows either character input branch 541, character selection branch 542, or expression selection branch 543 of the text entry process.

When the character input area 160 is entered, the character input branch 541 is taken, the pen strokes are entered into a buffer, and the handwriting recognition function determines which character was entered (step 550). The text entry device adds the determined character (step 560) to the text entry field 170. The text entry device calculates the characters most likely to be selected by the user as the next character to be entered (step 579) and updates the anticipated character selection field 240 (step 580). The text entry device next calculates the expression most likely to be ultimately entered by the user based on a database of expressions (step 590) and updates the anticipated expression field 310 (step 600).

If, on the other hand, the character selection field 240 is entered, the character selection branch 542 is taken and the selected character is added to the text entry field 170 (step 610). The text entry device calculates the characters most likely to be selected by the user as the next character to be entered (step 570) and updates the anticipated character selection field 240 (step 580). The text entry device next calculates the expression most likely to be ultimately entered by the user based on a database of expressions (step 590) and updates the anticipated expression field 310 (step 600).

Lastly, if the anticipated expression field 310 is entered, the expression selection branch 543 is taken. The text entry device calculates the characters most likely to be selected by the user as the next character to be entered (step 570) and updates the anticipated character selection field 240 (step 580). The text entry device next calculates the expressions most likely to be ultimately entered by the user based on a database of expressions (step 590) and updates the anticipated expression field 310 (step 600).

After either the character input branch 541, the character selection branch 542, or the expression selection branch 543, is completed with the updating of the anticipated expression field (step 600), the text entry device returns to idle (step 520) and waits for the user to make an entry. At this point, the user can continue entering characters using the handwriting recognition method, the character selection method, or the expression selection method, or the user can press "enter" signifying that the desired entry into the computing device is complete. Once the user presses "enter," the text entry device updates the character database memory and the expression database memory (step 630). The text entry device then processes the inputted text in a matter consistent with the application running on the computing device (step 640) and returns to idle (step 520) where it awaits further user input.

Figure 7:
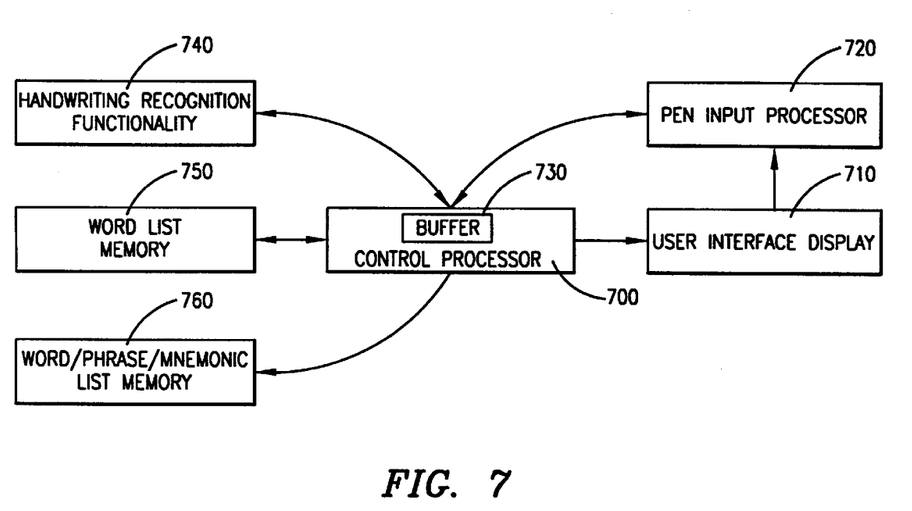
FIG. 7 illustrates a functional block diagram of the present invention.

Referring now to FIG. 7, there is illustrated a functional block diagram of an embodiment of the present invention. The various functional blocks depicted in FIG. 7 form the internal functionality 110 of FIG. 1. The text entry device of the present invention includes a control processor 700 for controlling the overall operation of the text entry device. Under direction of the control processor 700, a user interface display 710, interfaces to, and controls the display screen 120 of FIG. 1. In addition to controlling the display screen 120 of FIG. 1, the user interface display 710 also controls the pen input processor 720 which contains functionality for detecting user input from the pen 130 of FIG. 1. The pen input processor 720 communicates selections of characters, expressions, or "enter" made by the user when the pen 130 of FIG. 1 is depressed against the display screen 120 of FIG. 1, to the control processor 700. When the user prints a character in the character input area 160 of FIG. 2, the pen input processor 720 places the pen stroke information into the internal buffer 730 of the control processor 700. This pen stroke information is then accessed by the handwriting recognition functionality 740 which determines the particular character which has been entered and informs the control processor 700. The control processor calculates the characters which are likely to be entered by the user based on the characters entered by the user thus far and a word database memory 750 which contains a list of possible words to be entered by the user. The control processor 700 also calculates the expressions which are likely to be the ultimate entry desired by the user based on the characters entered thus far and expressions contained in the expression database memory 760.

Although the description of the present invention has included separate databases for the list of words used in the anticipated character selection field 240 of FIG. 5, and for the list of expressions 310 of FIG. 5, these databases can also be combined into a single database. Furthermore, while the present invention is intended for keyboardless devices, the invention works equally well in a device having a keyboard to input text.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A text entry device for presenting and gathering textual information in a computing device, the text entry device comprising:

a pen based entry and display screen coupled to the computing device, the display screen for displaying and gathering textual information;

a database stored within the computing device, the database comprising a list of expressions which are potential entries to the computing device;

a text entry field located on the display screen for displaying text entered into the computing device;

a handwritten character input area located on the display screen for inputting and displaying user-printed characters to be entered into the computing device, the computing device having character recognition capabilities for identifying characters printed in the character input area;

an anticipated character selection field located on the display screen, the anticipated character selection field for displaying a subset of characters likely to be entered into the computing device from among an entirety of characters based on comparison between characters displayed in the text entry field and expressions listed in the database; wherein, the subset of characters comprising a list of individual characters that may be selected as the next character to be input;

an anticipated expression selection field located on the display screen, the anticipated expression selection field for displaying a plurality of expressions likely to be entered into the computing device based on comparison between characters displayed in the text entry field and expressions listed in the database; wherein, anticipated expression selection field includes multi word or mnemonic or alphanumeric expressions;

an input processor operably coupled to the display screen and operably coupled to a control processor, the input processor for detecting input information to the display screen in at least the character input area, the anticipated character selection area, and the expression selection area and further, for communicating the detected input information to the control processor; and a control processor operably coupled to the input processor, the display screen, and the database, the control processor for controlling and coordinating the text entry device.

2. The text entry device as recited in claim 1, wherein the anticipated character selection field is variable in the number of characters displayed.

3. The text entry device as recited in claim 1, wherein the anticipated expression selection field is variable in the length and number of entries.

4. The text entry device as recited in claim 1, wherein the database of expressions comprises an exhaustive list of words.

5. The text entry device as recited in claim 1, wherein the database of expressions comprises a list of expressions which is incrementally created as expressions are entered into the computing device and added to the database.

6. The text entry device as recited in claim 1, wherein the database of expressions comprises a list of expressions associated with a computing applications running on the computing device.

7. The text entry device as recited in claim 1, wherein the database of expressions comprises an exhaustive list of words, a list of expressions associated with computing applications running on the computing device, and the entries to the list further being added as expressions are entered into the computing device.

8. The text entry device as recited in claim 1, wherein the display screen is responsive to pressure for inputting information.

9. The text entry device as recited in claim 1, wherein the display screen is responsive to light for inputting information.

10. An apparatus for presenting and gathering textual information, the apparatus comprising:

a pen based entry and display screen for gathering and displaying textual information;

a database of expressions, the database comprising a list of expressions which are potential entries;

a text entry field located on the display screen for displaying text entered;

a hand written character input area located on the display screen for inputting and displaying user provided characters;

an anticipated character selection field located on the display screen, the anticipated character selection field for displaying a subset of characters likely to be entered from among an entirety of characters based on comparison between characters displayed in the text entry field and expressions listed in the database; wherein, the subset of characters comprising a list of individual characters that may be selected as the next character to be input;

an anticipated expression selection field located on the display screen, the anticipated expression selection field for displaying a plurality of expressions likely to be entered based on comparison between characters displayed in the text entry field and expressions listed in the database; wherein, anticipated expression selection field includes multi word or mnemonic or alphanumeric expressions;

an input device for inputting characters into the character input area, selecting characters from the character selection field, and selecting expressions from the expression selection field; and a control processor operably coupled to the input means, the display screen, and the database, the control processor for controlling and coordinating the text entry device.

11. A method for presenting and gathering textual information in a computing device comprising the steps of:

constructing a database within the computing device, the database comprising a list of expressions which are potential entries to the computing device;

displaying a text entry field located on a display screen for displaying text entered into the computing device;

displaying a character input area located on the display screen for user printed characters to be entered into the computing device, the computing device having character recognition capabilities for identifying characters printed in the character input area;

displaying an anticipated character selection field located on the display screen, the anticipated character selection field for displaying a subset of characters likely to be entered into the computing device from among an entirety of characters based on comparison between characters displayed in the text entry field and expressions listed in the database; wherein, the subset of characters comprising a list of individual characters that may be selected as the next character to be input;

displaying an anticipated expression selection field located on the display screen, the anticipated expression selection field for displaying a plurality of expressions likely to be entered into the computing device based on comparison between characters displayed in the text entry field and expressions listed in the database; wherein, anticipated expression selection field includes multi word or mnemonic or alphanumeric expressions;

detecting input to the display screen in at least the character input area, the anticipated character selection area, and the expression selection area of the display screen; and controlling the operation of the text entry device by a controller coupled to the display screen and the database.

* * * * *